US007243419B2

(12) United States Patent
Cheng

(10) Patent No.: US 7,243,419 B2
(45) Date of Patent: Jul. 17, 2007

(54) SPARK PLUG BOOT REMOVAL TOOL

(76) Inventor: Dara Cheng, P.O. Box 114148, Nashville, TN (US) 37222

( * ) Notice: Subject to any disclaimer, the term of this patent is extended or adjusted under 35 U.S.C. 154(b) by 0 days.

(21) Appl. No.: 11/386,473

(22) Filed: Mar. 23, 2006

(65) Prior Publication Data

US 2006/0216975 A1 Sep. 28, 2006

Related U.S. Application Data

(60) Provisional application No. 60/665,225, filed on Mar. 28, 2005.

(51) Int. Cl.
*B23P 19/00* (2006.01)

(52) U.S. Cl. ............................ 29/762; 29/764; 29/260; 294/19.1; 294/104; 81/383; 81/345

(58) Field of Classification Search .................. 29/718, 29/721, 729, 758–764, 260–267, 280; 81/345, 81/383, 487, 488; 294/19.1, 116, 104; 222/192, 222/210, 527; 401/202–205
See application file for complete search history.

(56) References Cited

U.S. PATENT DOCUMENTS

| | | | | | |
|---|---|---|---|---|---|
| 1,959,617 | A | * | 5/1934 | Damjan | 294/50.8 |
| 2,518,994 | A | * | 8/1950 | Miller | 606/205 |
| 2,947,564 | A | * | 8/1960 | Winther | 294/100 |
| 4,202,088 | A | * | 5/1980 | Hansen | 29/280 |
| 4,571,824 | A | * | 2/1986 | Ingaglio | 29/764 |
| 5,009,343 | A | * | 4/1991 | Pugatch | 222/192 |
| 5,253,408 | A | * | 10/1993 | Wright | 29/280 |
| 5,490,819 | A | * | 2/1996 | Nicholas et al. | 600/201 |
| 5,572,913 | A | * | 11/1996 | Nasiell | 81/177.6 |
| 5,857,723 | A | * | 1/1999 | Mathieu et al. | 294/19.1 |
| 5,922,007 | A | * | 7/1999 | Hoogeboom et al. | 606/205 |
| 6,669,254 | B2 | * | 12/2003 | Thom et al. | 294/19.1 |

* cited by examiner

*Primary Examiner*—Minh Trinh
(74) *Attorney, Agent, or Firm*—Eric Hanscom

(57) ABSTRACT

The present invention involves a spark plug boot removal tool having a handle portion, an extension portion, and a grasping portion. The handle portion includes a spring-loaded trigger. The grasping portion includes a fixed grasping member and a rotatable grasping member. The extension portion includes an elongated flexible shaft enclosing a control rod that is attached to a triangular block. When the grasping portion is positioned over a spark plug boot, the trigger is compressed, causing the control rod to pull the block, causing the rotatable grasping member to join with the fixed grasping member to clamp around the spark plug boot. Both grasping members have an angular bend that allows the user to position the elongated flexible shaft outside of the engine compartment when exerting a force on the handle portion to remove the spark plug boot, thus minimizing the risk of injury.

20 Claims, 4 Drawing Sheets

SPARK PLUG BOOT REMOVAL TOOL

PRIORITY

This application claims the benefit of U.S. Provisional Patent Application Ser. No. 60/665,225 filed on Mar. 28, 2005.

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF INVENTION

1. Field of the Invention

The invention generally relates to the field of hand-held mechanical devices. More particularly, the present invention involves a hand-held tool for removing a spark plug boot from a spark plug.

2. Description of the Related Art

Removing the boot from around a spark plug has been a concern for mechanics since the first spark was used to fire up a car engine. The boot must be removed carefully, as the spark plug and the threads with which it is inserted into the engine block are a delicate and essential part of the engine. Pulling on the spark plug wire itself may break an internal electrical connection, preventing the timing signal from ever reaching the spark plug in the future. At the same time, spark plugs are located fairly deep within the hood of a car, making them difficult to reach. In addition, sparks plugs in many vehicles are slanted at various angles, so even if a mechanic grasps the boot with his or her hand, there is a danger that in removing the boot the mechanic's hand will be injured as the hand smashes into the car body after the boot releases its hold on the spark plug.

Therefore, there is a present need for a hand-held device for quickly and efficiently removing a spark plug boot from a spark plug that is easy to use, helps to prevent damage to the spark plug, and minimizes the risk of injury to the user.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

SUMMARY OF THE INVENTION

A primary object of this invention is to provide a quick and efficient tool for removing the boot from a spark plug attached to an engine.

It is a further object of this invention to accomplish the removal of the spark plug boot with minimum damage to the boot, spark plug, spark plug wire, and the hand of the user.

It is another object of this invention that a user be able to maneuver the flexible shaft of the invention to avoid engine obstacles.

It is a still another object of this invention to provide a unique hand-held spark plug boot removal device to the field of hand-held mechanical devices.

These objects and further objects and features of the invention will be apparent to one skilled in the art from the disclosure of the present invention as set forth herein.

The present invention involves a spark plug boot removal tool having a handle portion, an extension portion, and a grasping portion. The handle portion includes a spring-loaded trigger. The grasping portion includes a fixed grasping member and a rotatable grasping member. The extension portion includes an elongated flexible shaft enclosing a control rod that is attached to a triangular block. When the grasping portion is positioned over a spark plug boot, the trigger is compressed, causing the control rod to pull the block, causing the rotatable grasping member to join with the fixed grasping member to clamp around the spark plug boot. Both grasping members have an angular bend that allows the user to position the elongated flexible shaft outside of the engine compartment when exerting a force on the handle portion to remove the spark plug boot, thus minimizing the risk of injury.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto.

BRIEF DESCRIPTION OF THE DRAWINGS.

The accompanying drawings, which are incorporated in and form a part of this specification, illustrate embodiments of the invention and together with the description, serve to explain the principals of this invention.

DETAILED DESCRIPTION OF THE INVENTION.

Figure 1:
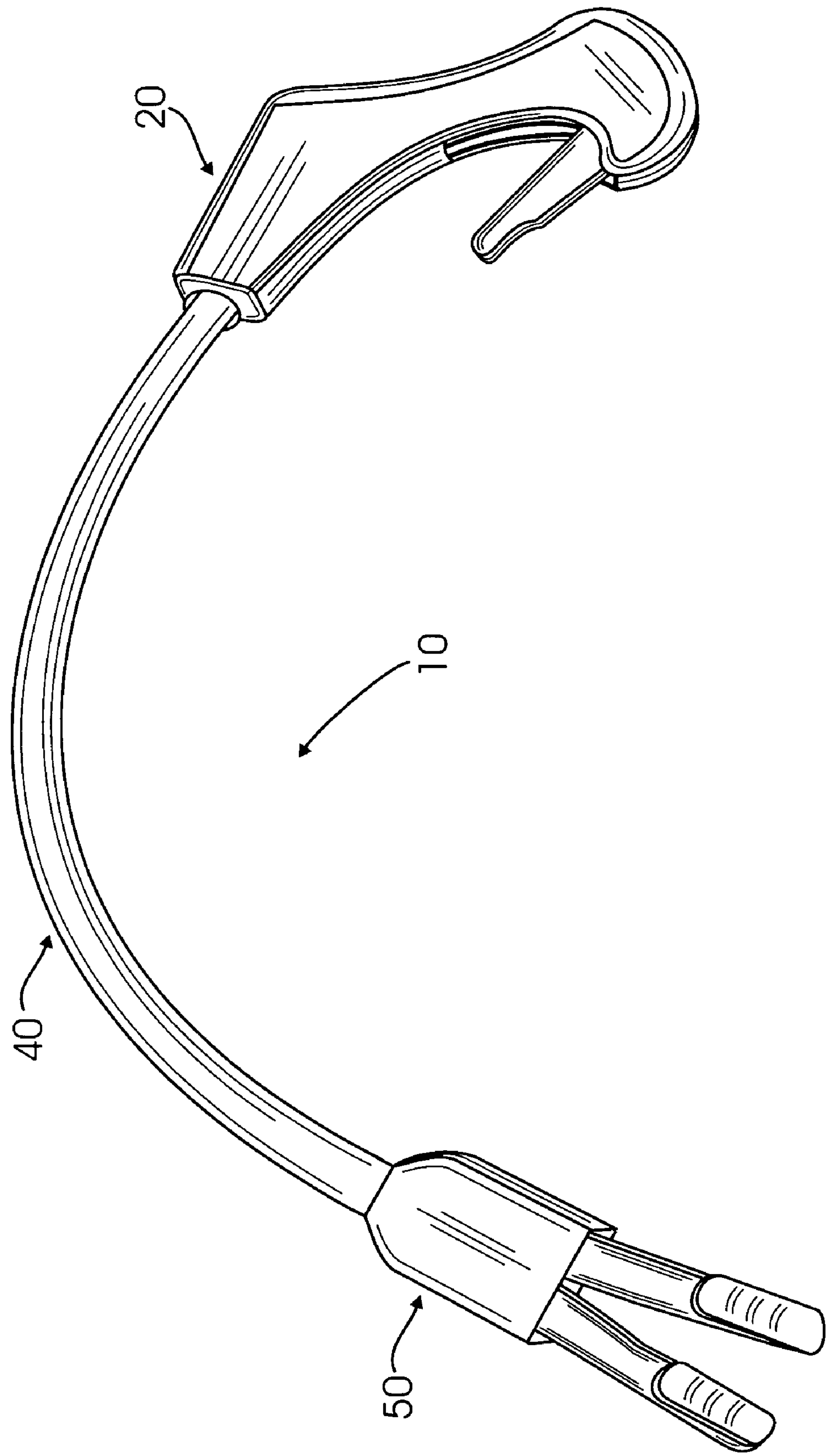
FIG. 1 is perspective view of the preferred embodiment of the spark plug boot removal tool.

Referring now to the drawings, FIG. 1 shows a perspective view of the preferred embodiment of the spark plug boot removal tool 10. Spark plug boot removal tool 10 preferably includes a handle portion 20, an extension portion 40, and a grasping portion 50.

Figure 2:
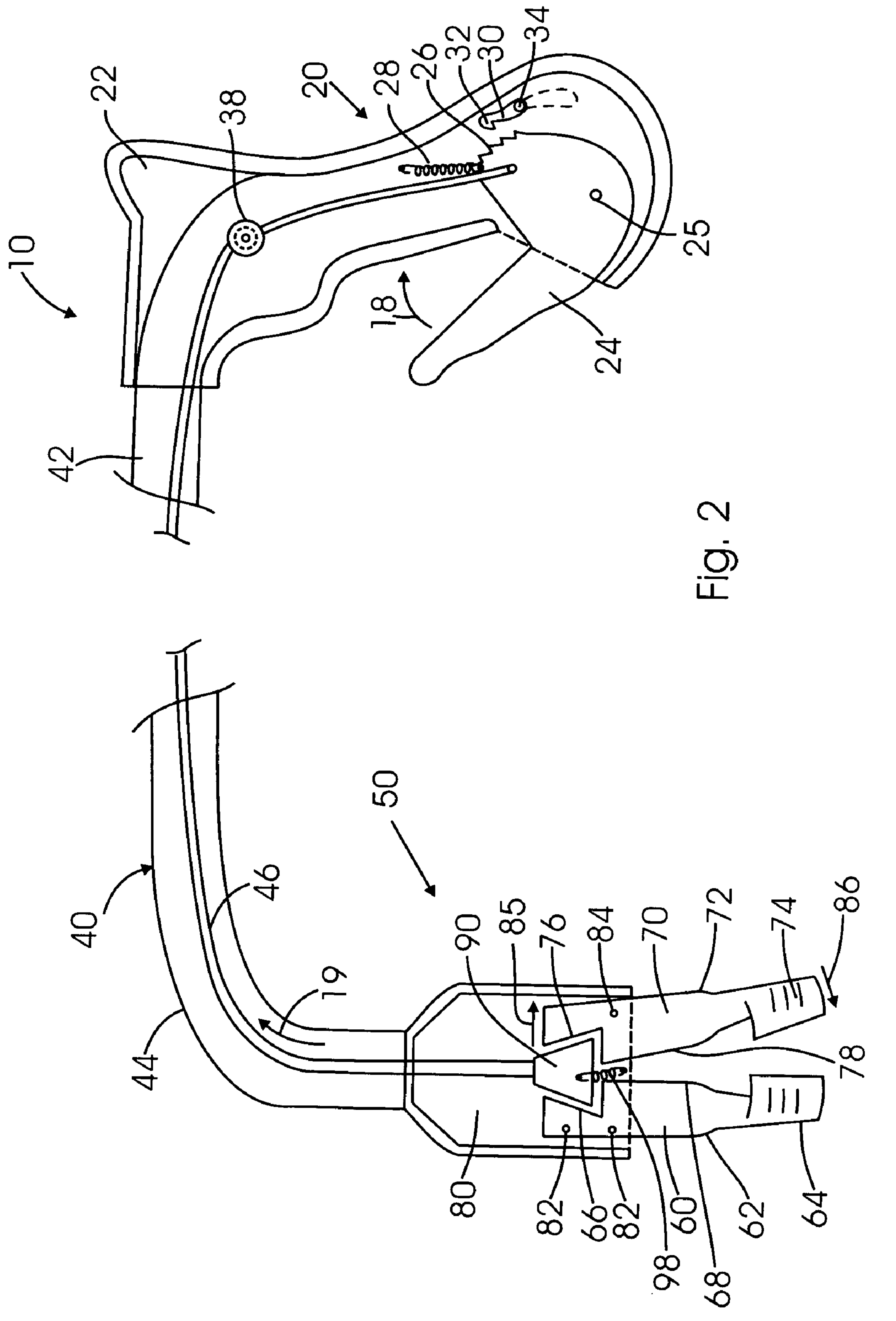
FIG. 2 is a cross-sectional view of the preferred embodiment of the spark plug boot removal tool.

FIG. 2 shows a cross-sectional view of spark plug boot removal tool 10. Handle portion 20 includes two opposing mating halves 22 (one shown). A trigger 24 having teeth 26 is positioned between mating halves 22. A return spring 28 is attached on one end to the interior of handle portion 20 and on the other end to trigger 24. Return spring 28 ensures that when a user is not compressing trigger 24, trigger 24 is in an “open” position. If a user is compressing trigger 24, the user can “lock” trigger 24 in a “closed” position by depressing a lock tab 30, causing a lock tooth 32 to rotate about a lock pivot point 34 and catch in teeth 26.

Grasping portion 50 includes a fixed grasping member 60 and a rotatable grasping member 70. Fixed grasping member 60 is attached to a grasping body 80 at attachment points 82, while rotatable grasping member 70 is attached to grasping body 80 at attachment point 84. Attachment point 84 serves as a pivot point for rotatable grasping member 70. The unattached portion of fixed grasping member 60 contains a bend 62. Similarly, the unattached portion of rotatable grasping member 70 contains a bend 72. Bend 62 and bend 72 offset the respective portions of fixed grasping member 60 and rotatable grasping member 70 that are contained within grasping body 80, approximately 20 degrees from fixed grasping member end 64 and rotatable grasping member end 74. End 64 and end 74 are curved surfaces intended to, when pushed toward each other, form a circle of a diameter slightly smaller than the boot which covers a spark plug (not shown).

Fixed grasping member 60 also contains an indentation 66 located on one side 68 of the portion contained within grasping body 80. Similarly, rotatable grasping member 70 also contains an indentation 76 located on one side 78 of the portion contained within grasping body 80. Indentation 66 and indentation 76 are angular depressions that, when both contacted by a triangular pull block 90, cause the portion of rotatable grasping member 70 contained within grasping body 80 to move outwardly from fixed grasping member 60 (shown by arrow 85), to cause rotatable grasping member end 74 to move inwardly toward fixed grasping member 60 (shown by arrow 86). When pull block 90 is not being pulled back by a user compressing trigger 24, a return spring 98 returns pull block 90 to its normal position, in which rotatable grasping member 70 is in the “open” position.

Extension portion 40 is comprised of a flexible shaft 42. Shaft 42 contains an outer body 44. Shaft 42 allows a mechanic to maneuver spark plug boot removal tool 10 around obstacles in a vehicle engine and still be able to effectively remove the boot from a spark plug. Outer body 44 encloses a control rod 46. Control rod 46 is preferably a piece of metal that begins in pull block 90 and can be secured within pull block 90 by untwisting its wires (not shown) and allowing the wires to cool in pull block 90 as pull block 90 is cooling after having been poured into a mold. Alternatively, if pull block 90 is comprised of two pieces that are hammered or pressed together, the wires can be positioned between the pieces before the hammering or pressing for secure attachment. Control rod 46 extends from pull block 90 into handle portion 20, passing over a control rod guide 38, terminating at trigger 24. Control rod guide 38 rotates freely within handle portion 20, ensuring that control rod 46 can move freely. Thus, when a user pulls back on trigger 24, trigger 24 rotates about trigger pivot 25 in a clockwise direction (shown by arrow 18) and exerts a pull on control rod 46 in a direction shown by arrow 19, causing rotatable grasping member 70 to move inward toward fixed grasping member 60.

Figure 3B:
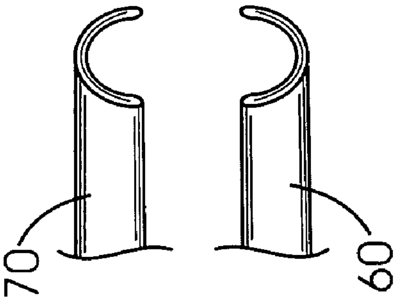
FIG. 3B shows a partial end view of the fixed grasping member and the rotatable grasping member unattached from grasping body.
Figure 3A:
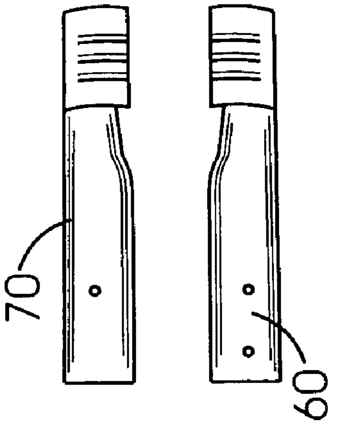
FIG. 3A shows a top view of the fixed grasping member and the rotatable grasping member unattached from the grasping body.

FIG. 3A shows a top view of fixed grasping member 60 and rotatable grasping member 70 unattached from grasping body 80 (not shown).

FIG. 3B shows a partial end view of fixed grasping member 60 and rotatable grasping member 70 unattached from grasping body 80 (not shown).

Figure 3C:
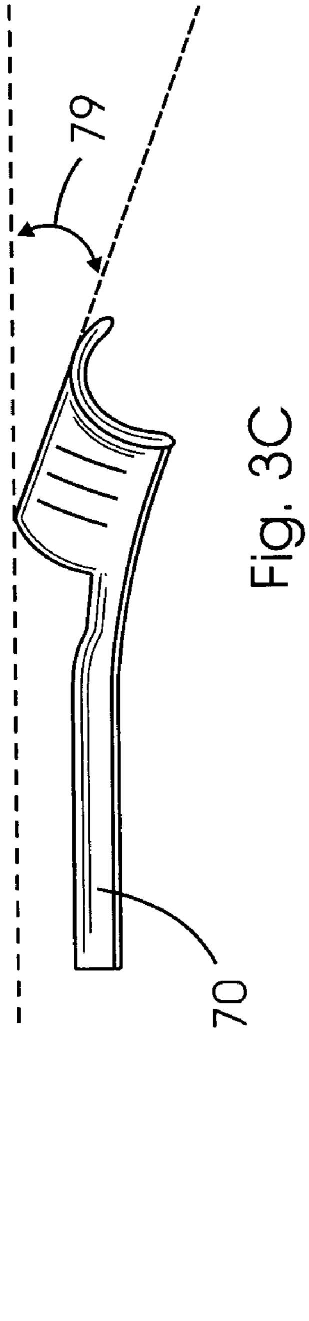
FIG. 3C shows a bottom perspective view of the rotatable grasping member unattached from the grasping body, illustrating the angular bend of approximately 20 degrees contained in both the fixed grasping member and the rotatable grasping member.

FIG. 3C shows a bottom perspective view of rotatable grasping member 70 unattached from grasping body 80, illustrating the bend angle 79 of approximately 20 degrees from the rest of rotatable grasping member 70 contained in both fixed grasping member 60 and rotatable grasping member 70. The angular bend allows a user to remove the boot of a spark plug in a safe and easy manner, without having to worry about smashing one’s hand into other engine parts or the side of the car.

Figure 4:
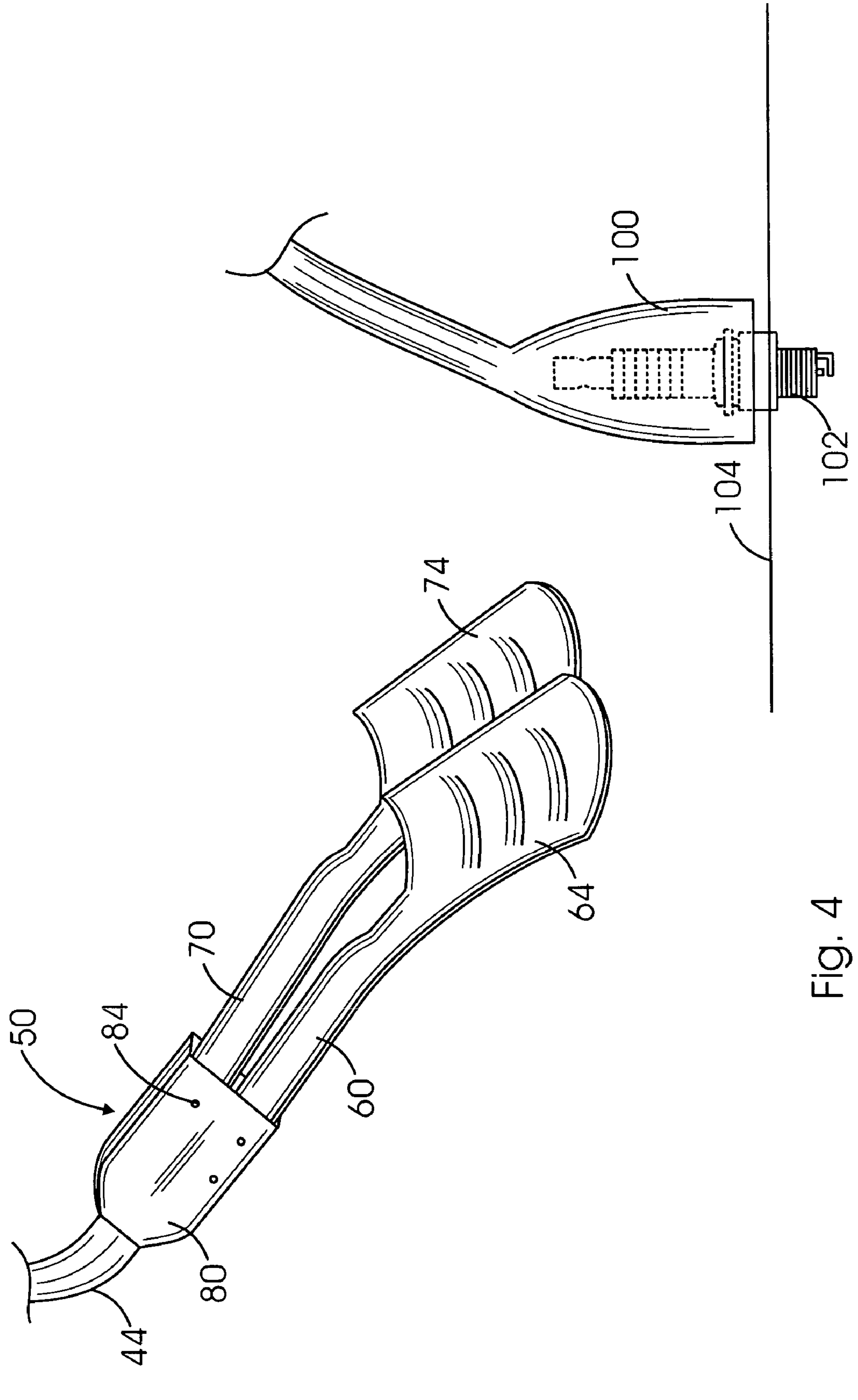
FIG. 4 shows a perspective view of the positioning of the grasping portion just prior to engagement with a spark plug boot.

FIG. 4 shows a perspective view of the positioning of grasping portion 50 just prior to engagement with a spark plug boot 100. Spark plug boot 100 covers spark plug 102, which is attached to engine 104. As end 64 and end 74 are lowered onto spark plug boot 100, a user compresses trigger 24, which pulls control rod 38 and thus pull block 80 (see FIG. 2), causing rotatable grasping member 70 to rotate about attachment point 84 such that end 64 and end 74 close around spark plug boot 100. When closed, because end 64 and end 74 form a circle that has a diameter that is smaller than the diameter of spark plug boot 100, end 64 and end 74 will provide a secure engagement of spark plug boot removal tool 10 to spark plug boot 100. While still compressing trigger 24 or after trigger 24 has been “locked” by depressing lock tab 30 (not shown), a user can then exert a force on handle portion 20 (not shown) away from engine 104 to separate spark plug boot 100 from spark plug 102.

Because of the angular positioning of fixed grasping member 60 and rotatable grasping member 70, a user can pull the invention upward in a purely vertical manner and still remove the boot. This allows the user to exert the force from an area outside of the engine compartment, where there is no risk of injuring a user’s hand against the engine or car. Previous devices require a user to pull in the opposite direction to which the spark plug is attached to the engine, which often requires still pulling within the engine and hood region, thereby increasing the chance that when the boot disengages from the spark plug the user’s hand will smash into other engine components or the car body itself.

With respect to the above description it is to be realized that the optimum dimensional relationships for the parts of the invention, including variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents fall within the scope of the present invention.

The above description, together with the objects of the invention and the various features of novelty which characterize the invention, are pointed out with particularity in the claims annexed to and forming a part of this disclosure. For a better understanding of the invention, its operating advantages and the specific advantages attained by its uses, reference should be made to the accompanying drawings and descriptive matter in which there are illustrated preferred embodiments of the invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting, as to the scope of the invention in any way.

I claim:

1. A device for removing the boot from a spark plug, comprising:

a) a handle portion, the handle portion comprising two opposing mating halves substantially bounding an interior region, a trigger rotatably attached to the handle portion, one end of the trigger being disposed within the interior region and the other end of the trigger extending from the interior region;

b) an extension shaft coupled on one end to the handle portion;

c) a grasping portion coupled to the other end of the extension shaft, the grasping portion comprising a grasping body, a fixed grasping member coupled to the grasping body, a rotatable grasping member coupled to the grasping body, and a pull block disposed within the region bounded by the grasping body and between indentations formed within both the fixed grasping member and the rotatable grasping member; and d) a control rod coupled on one end to the end of the trigger disposed within the interior region and on the other end to the pull block, the control rod extending from the handle portion through the extension shaft to the grasping portion whereby to remove a spark plug boot from a spark plug, a user positions the grasping portion over a spark plug boot and compresses the end of the trigger extending from the interior region, causing the control rod to exert a force on and lift the pull block into contact with the fixed grasping member and the rotatable grasping member, causing the rotatable grasping member to move towards the fixed grasping member and thus clamp around the spark plug boot, wherein the user then can exert a force on the handle portion outside of the engine compartment to remove the spark plug boot from the spark plug.

2. The device of claim 1, wherein the distal ends of both the fixed grasping member and the rotatable grasping member contain a bend at an angle of about twenty degrees for the purpose allowing a user to exert a pulling force on the handle portion at a non-parallel angle to the spark plug when removing a spark plug boot from a spark plug.

3. The device of claim 1 further comprising a return spring coupled on one end to the end of the trigger disposed within the interior region and on the other end to one of the mating halves for the purpose of returning the trigger to an uncompressed position when the trigger is not being compressed by a user.

4. The device of claim 1, wherein the extension shaft is flexible.

5. The device of claim 1, wherein the pull block is triangular in shape.

6. The device of claim 1, wherein the handle portion further comprises a lock tab disposed within the interior region for the purpose of locking the trigger into a compressed position.

7. The device of claim 6, wherein the trigger further comprises a plurality of teeth for the purpose of engaging the lock tab.

8. The device of claim 1 further comprising a control rod guide rotatably disposed within the interior region for the purpose of guiding the control rod within the handle portion.

9. The device of claim 1, wherein the distal ends of both the fixed grasping member and the rotatable grasping member are covered with a layer of non-slip material.

10. The device of claim 1, wherein the distal ends of both the fixed grasping member and the rotatable grasping member contain a semi-circular region for clamping to a spark plug boot.

11. The device of claim 1, wherein the circular diameter formed by the closing of both the end of the fixed grasping member and the end of the rotatable grasping member is smaller than the circular diameter of a spark plug boot.

12. The device of claim 1 further comprising a pull block return spring coupled on one end to one end of the pull block and on the other end to the grasping body for the purpose of returning the pull block to a resting position when the trigger is uncompressed.

13. A device for removing the boot from a spark plug, comprising:

a) a handle portion, the handle portion comprising two opposing mating halves substantially bounding an interior region, a trigger rotatably attached to the handle portion, one end of the trigger being disposed within the interior region and the other end of the trigger extending from the interior region, the end of the trigger disposed within the interior region having a plurality of teeth, a lock tab disposed within the interior region for the purpose of engaging one or more of the plurality of teeth to lock the trigger into a compressed position b) a flexible extension shaft coupled on one end to the handle portion;

c) a grasping portion coupled to the other end of the extension shaft, the grasping portion comprising a grasping body, a fixed grasping member coupled to the grasping body, a rotatable grasping member coupled to the grasping body, and a pull block disposed within the region bounded by the grasping body and between indentations formed within both the fixed grasping member and the rotatable grasping member; and d) a control rod coupled on one end to the end of the trigger disposed within the interior region and on the other end to the pull block, the control rod extending from the handle portion through the extension shaft to the grasping portion whereby to remove a spark plug boot from a spark plug, a user positions the grasping portion over a spark plug boot and compresses the end of the trigger extending from the interior region, causing the control rod to exert a force on and lift the pull block into contact with the fixed grasping member and the rotatable grasping member, causing the rotatable grasping member to move towards the fixed grasping member and thus clamp around the spark plug boot, wherein the user then can exert a force on the handle portion outside of the engine compartment to remove the spark plug boot from the spark plug.

14. The device of claim 13, wherein the distal ends of both the fixed grasping member and the rotatable grasping member contain a bend at an angle of about twenty degrees for the purpose allowing a user to exert a pulling force on the handle portion at a non-parallel angle to the spark plug when removing a spark plug boot from a spark plug.

15. The device of claim 13 further comprising a pull block return spring coupled on one end to one end of the pull block and on the other end to the grasping body for the purpose of returning the pull block to a resting position when the trigger is uncompressed.

16. The device of claim 13, wherein the pull block is triangular in shape.

17. The device of claim 13, wherein the distal ends of both the fixed grasping member and the rotatable grasping member are covered with a layer of non-slip material.

18. The device of claim 13 further comprising a control rod guide rotatably disposed within the interior region for the purpose of guiding the control rod within the handle portion.

19. A device for removing the boot from a spark plug, comprising:

a) a handle portion, the handle portion comprising two opposing mating halves substantially bounding an interior region, a trigger rotatably attached to the handle portion, one end of the trigger being disposed within the interior region and the other end of the trigger extending from the interior region, the end of the trigger disposed within the interior region having a plurality of teeth, a lock tab disposed within the interior region for the purpose of engaging one or more of the plurality of teeth to lock the trigger into a compressed position b) a flexible extension shaft coupled on one end to the handle portion;

c) a grasping portion coupled to the other end of the extension shaft, the grasping portion comprising a grasping body, a fixed grasping member coupled to the grasping body, a rotatable grasping member coupled to the grasping body, and a pull block disposed within the region bounded by the grasping body and between indentations formed within both the fixed grasping member and the rotatable grasping member, the distal ends of both the fixed grasping member and the rotatable grasping member contain a bend at an angle of about twenty degrees for the purpose allowing a user to exert a pulling force on the handle portion at a non-parallel angle to the spark plug when removing a spark plug boot from a spark plug; and d) a control rod coupled on one end to the end of the trigger disposed within the interior region and on the other end to the pull block, the control rod extending from the handle portion through the extension shaft to the grasping portion whereby to remove a spark plug boot from a spark plug, a user positions the grasping portion over a spark plug boot and compresses the end of the trigger extending from the interior region, causing the control rod to exert a force on and lift the pull block into contact with the fixed grasping member and the rotatable grasping member, causing the rotatable grasping member to move towards the fixed grasping member and thus clamp around the spark plug boot, wherein the user then can exert a force on the handle portion outside of the engine compartment to remove the spark plug boot from the spark plug.

20. The device of claim 19 further comprising a pull block return spring coupled on one end to one end of the pull block and on the other end to the grasping body for the purpose of returning the pull block to a resting position when the trigger is uncompressed.

* * * * *